United States Patent
Magario et al.

(10) Patent No.: US 8,052,918 B2
(45) Date of Patent: *Nov. 8, 2011

(54) CARBON-BASED MATERIAL AND METHOD OF PRODUCING THE SAME, AND COMPOSITE MATERIAL AND METHOD OF PRODUCING THE SAME

(75) Inventors: Akira Magario, Nagano-ken (JP); Toru Noguchi, Ueda (JP)

(73) Assignee: Nissin Kogyo Co., Ltd., Ueda-Shi (JP)

( * ) Notice: Subject to any disclaimer, the term of this patent is extended or adjusted under 35 U.S.C. 154(b) by 1810 days.

This patent is subject to a terminal disclaimer.

(21) Appl. No.: 11/183,753

(22) Filed: Jul. 19, 2005

(65) Prior Publication Data

US 2010/0015032 A1    Jan. 21, 2010

(30) Foreign Application Priority Data

Jul. 21, 2004 (JP) .................. 2004-212854
Jul. 19, 2005 (JP) .................. 2005-208076

(51) Int. Cl.
*C01B 31/10* (2006.01)

(52) U.S. Cl. ...... 264/648; 264/82; 264/29.6; 423/447.6; 423/460

(58) Field of Classification Search .......... 428/221; 264/603, 29.5, 29.6, 641, 648; 423/447.6, 423/460
See application file for complete search history.

(56) References Cited

U.S. PATENT DOCUMENTS

| | | | |
|---|---|---|---|
| 3,297,667 A | 1/1967 | Von Dohlen et al. | |
| 3,482,963 A | 12/1969 | Osborn et al. | |
| 3,619,430 A | 11/1971 | Hiratsuka et al. | |
| 3,828,839 A | 8/1974 | Dhingra | |
| 4,351,484 A | 9/1982 | Hart | |
| 4,412,675 A | 11/1983 | Kawakubo | |
| 4,450,207 A | 5/1984 | Donomoto et al. | |
| 4,902,457 A | 2/1990 | Wada et al. | |
| 5,015,289 A | 5/1991 | Toda et al. | |
| 5,348,592 A | 9/1994 | Garg et al. | |
| 5,372,775 A | 12/1994 | Hayashi et al. | |
| 5,458,181 A | 10/1995 | Corbett et al. | |
| 5,573,607 A | 11/1996 | Weaver | |
| 5,669,434 A | 9/1997 | Nakao et al. | |
| 5,744,235 A | 4/1998 | Creehan | |
| 5,843,567 A * | 12/1998 | Swift et al. ............... | 428/221 |

(Continued)

FOREIGN PATENT DOCUMENTS

EP    1 600 231    11/2005

(Continued)

OTHER PUBLICATIONS

U.S. Appl. No. 10/895,351, filed Jul. 21, 2004, Noguchi et al.

(Continued)

*Primary Examiner* — Christina Johnson
*Assistant Examiner* — Galen Hauth
(74) *Attorney, Agent, or Firm* — Oliff & Berridge, PLC

(57) ABSTRACT

A method of producing a carbon-based material having an activated surface includes: (a) mixing an elastomer and a carbon material, and dispersing the carbon material by applying a shear force to obtain a composite elastomer; and (b) heat-treating the composite elastomer at a temperature for vaporising an elastomer to vaporize the elastomer in the composite elastomer.

20 Claims, 4 Drawing Sheets

U.S. PATENT DOCUMENTS

| | | | |
|---|---|---|---|
| 6,184,177 B1 * | 2/2001 | von Blucher et al. | 502/434 |
| 6,193,915 B1 | 2/2001 | Lo et al. | |
| 6,221,948 B1 | 4/2001 | Yamaguchi et al. | |
| 6,271,163 B1 * | 8/2001 | Yushio et al. | 501/98.5 |
| 6,372,347 B1 | 4/2002 | Yamaguchi et al. | |
| 6,538,166 B1 * | 3/2003 | Mahjoob | 585/241 |
| 6,919,401 B2 | 7/2005 | Mabuchi et al. | |
| 7,803,297 B2 | 9/2010 | Magario et al. | |
| 2003/0125474 A1 | 7/2003 | Yatsuyanagi | |
| 2004/0182285 A1 | 9/2004 | Mazany et al. | |
| 2004/0241440 A1 | 12/2004 | Noguchi et al. | |
| 2005/0192396 A1 | 9/2005 | Noguchi et al. | |
| 2005/0194115 A1 | 9/2005 | Noguchi et al. | |
| 2006/0016522 A1 | 1/2006 | Noguchi et al. | |
| 2006/0057387 A1 | 3/2006 | Magario et al. | |
| 2006/0155009 A1 | 7/2006 | Magario et al. | |
| 2010/0015032 A1 | 1/2010 | Magario et al. | |

FOREIGN PATENT DOCUMENTS

| | | |
|---|---|---|
| EP | 1 632 457 A2 | 3/2006 |
| JP | A-57-188464 | 11/1982 |
| JP | A 05-078110 | 3/1993 |
| JP | A-08-127674 | 5/1996 |
| JP | A-09-324128 | 12/1997 |
| JP | A-2001-114903 | 4/2001 |
| JP | A-2002-071595 | 3/2002 |
| JP | A-2003-012863 | 1/2003 |
| JP | A-2003-155384 | 5/2003 |
| JP | A-2004-143284 | 5/2004 |
| WO | WO 90/10296 | 9/1990 |
| WO | WO 2004/059663 | 7/2004 |

OTHER PUBLICATIONS

U.S. Appl. No. 11/041,258, filed Jan. 25, 2005, Noguchi et al.
U.S. Appl. No. 11/046,249, filed Jan. 31, 2005, Noguchi et al.
U.S. Appl. No. 11/133,204, filed May 20, 2005, Noguchi et al.
U.S. Appl. No. 11/134,292, filed May 23, 2005, Magario et al.
U.S. Appl. No. 11/134,266, filed May 23, 2005, Noguchi et al.
U.S. Appl. No. 11/180,573, filed Jul. 14, 2005, Noguchi et al.
Noguchi et al., "Structure and Properties for Carbon Nanofiber/ Elastomer Nanocomposites," Sep. 10, 2003, 52d SPSJ Symposium on Macromolecules, pp. 1785-1786, (with English-language translation of relevant portions).
Magario et al., "Structure and Properties for Carbon Nanofiber/ Alminium Nanocomposites," Oct. 11, 2003, 133d Collected Abstracts of the 2004 Autumn Meeting of The Japan Institute of Metals, pp. 566, (with English-language translation of relevant portions).
T. Noguchi, "Carbon Nanotube/Aluminium Composites with Uniform Dispersion," Feb. 20, 2004, Materials Transactions, No. 2, vol. 45, pp. 602-604, (with English-language translation of relevant portions).
Noguchi et al., "Dynamic Properties for CNT/Al Nanocomposites," Mar. 30, 2004, 134th Collected Abstracts of the 2004 Spring Meeting of The Japan Institute of Metals, pp. 353, (with English-language translation of relevant portions).
Magario et al., "Structure and Thermal Properties for CNT/Al Nanocomposites," Mar. 30, 2004, 134th Collected Abstracts of the 2004 Spring Meeting of The Japan Institute of Metals, pp. 353, (with English-language translation of relevant portions).
Noguchi et al., "Preparation and Properties of Aluminum Nanocomposites by Matrix Substitution of Carbon Nanotube/ Elastomer Composites," May 20, 2004, 71st The Society of Rubber Industry, Japan Annual Meeting, pp. 30, (with English-language translation of relevant portions).
Noguchi et al., "Development of Carbon Nanotubes/Aluminum Composites and Expectation as Lightweight Member," Aug. 1, 2004, Engineering Materials, vol. 52, No. 8, (with English-language translation of relevant portions).
Magario et al., "CNT Peripheral Structure of CNT/Al Nanocomposites," Sep. 28, 2004; 135th Collected Abstracts of the 2004 Autumn Meeting of The Japan Institute of Metals, pp. 568, (with English-language translation of relevant portions).
Noguchi et al., "Thermal Expansion of CNT/Al Nanocomposites," Sep. 28, 2004, 135th Collected Abstracts of the 2004 Autumn Meeting of The Japan Institute of Metals, pp. 569, (with English-language translation of relevant portions).
U.S. Office Action issued in related U.S. Appl. No. 11/219,706 dated Aug. 14, 2006.
U.S. Office Action issued in related U.S. Appl. No. 11/219,706 dated Feb. 13, 2007.
U.S. Office Action issued in related U.S. Appl. No. 11/219,706 dated Aug. 6, 2007.
U.S. Office Action issued in related U.S. Appl. No. 11/219,706 dated Aug. 13, 2008.
U.S. Office Action issued in related U.S. Appl. No. 11/219,706 dated Feb. 26, 2009.
U.S. Office Action issued in related U.S. Appl. No. 11/219,706 dated Feb. 19, 2010.
U.S. Office Action issued in related U.S. Appl. No. 11/219,706 dated Jul. 16, 2009.
Office Action issued in U.S. Appl. No. 11/219,706 on Mar. 3, 2008.
Office Action issued in U.S. Appl. No. 12/852,110; mailed Dec. 23, 2010.
European Office Action issued Mar. 9, 2010 in Application No. 05 255 523.2.
Jun. 23, 2011 Office Action issued in U.S. Appl. No. 12/852,110.

* cited by examiner

PARTIALLY ENLARGED VIEW

CARBON-BASED MATERIAL AND METHOD OF PRODUCING THE SAME, AND COMPOSITE MATERIAL AND METHOD OF PRODUCING THE SAME

Japanese Patent Application No. 2004-212854, filed on Jul. 21, 2004 and Japanese Patent Application No. 2005-208076, filed on Jul. 19, 2005 are hereby incorporated by reference in their entirety.

BACKGROUND OF THE INVENTION

The present invention relates to a carbon-based material and a method of producing the same, and a composite material and a method of producing the same.

A composite material using a carbon material such as a carbon fiber, carbon black, graphite, or carbon nanofiber has attracted attention (e.g. Japanese Patent Application Laid-Open No. 5-78110). Such a composite material is expected to exhibit improved electrical conductivity, heat transfer properties, mechanical strength, and the like due to inclusion of the carbon material such as the carbon nanofibers.

However, the carbon material generally exhibits low wettability (affinity) with the matrix material of the composite material, and also exhibits low dispersibility in the matrix material. In particular, since the carbon nanofibers have strong aggregating properties, it is very difficult to uniformly disperse the carbon nanofibers in the matrix of the composite material. As the surface treatment for the carbon nanofibers, wet plating, evaporation, and the like have been studied. However, since the thickness of the surface-treated layer is increased, the carbon nanofibers are bonded through the surface-treated layer. Therefore, it is difficult to obtain a carbon nanofiber composite material having desired properties. Moreover, expensive carbon nanofibers cannot be efficiently utilized.

SUMMARY

According to a first aspect of the invention, there is provided a method of producing a carbon-based material, the method comprising:

(a) mixing an elastomer and a carbon material, and dispersing the carbon material by applying a shear force to obtain a composite elastomer; and (b) heat-treating the composite elastomer to vaporize the elastomer included in the composite elastomer.

According to a second aspect of the invention, there is provided a carbon-based material obtained by the above-described method.

According to a third aspect of the invention, there is provided a method of producing a composite material, the method comprising:

(c) mixing the carbon-based material obtained by the above-described method with a matrix material.

According to a fourth aspect of the invention, there is provided a method of producing a composite material, the method comprising:

(a) mixing an elastomer, a particulate or fibrous matrix material, and a carbon material, and dispersing the carbon material by applying a shear force to obtain a composite elastomer;

(b) heat-treating the composite elastomer to vaporize the elastomer included in the composite elastomer to obtain a carbon-based material; and (d) powder forming the carbon-based material.

According to a fifth aspect of the invention, there is provided a composite material obtained by any of the above-described methods of producing a composite material.

According to a sixth aspect of the invention, there is provided a carbon-based material, comprising a carbon material, wherein an element X bonds to carbon atom of the carbon material; and wherein the element X includes at least one element selected from beryllium, boron, nitrogen, oxygen, magnesium, silicon, phosphorus, and sulfur.

DETAILED DESCRIPTION OF THE EMBODIMENTS

Figure 1:
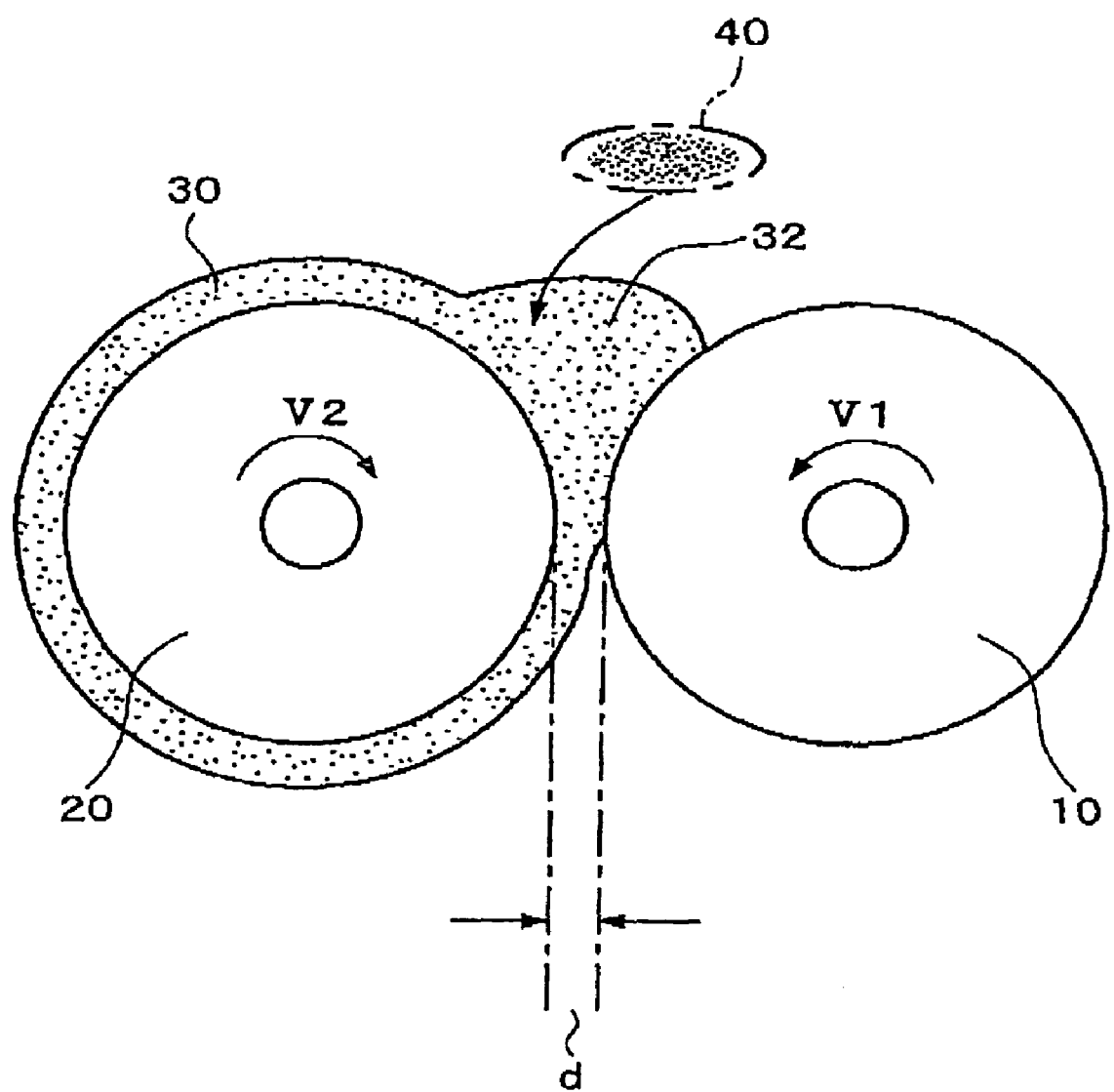
FIG. 1 schematically shows a mixing method for an elastomer and carbon nanofibers utilizing an open-roll method according to one embodiment of the invention.

The invention may provide a carbon-based material having an activated surface, and a method of producing the same. The invention may also provide a composite material in which a carbon material having an activated surface is uniformly dispersed, and a method of producing the same.

According to one embodiment of the invention, there is provided a method of producing a carbon-based material, the method comprising:

(a) mixing an elastomer and a carbon material, and dispersing the carbon material by applying a shear force to obtain a composite elastomer; and (b) heat-treating the composite elastomer to vaporize the elastomer included in the composite elastomer.

According to the step (a) of the method according to one embodiment of the invention, free radicals formed in the elastomer shorn by the shear force attack the surface of the carbon material, whereby the surface or the carbon material is activated. According to the step (b) of the method according to one embodiment of the invention, the carbon-based material having an activated surface remains after vaporizing the elastomer by the heat treatment. Since the carbon-based material has an activated surface and exhibits improved wettability with a matrix material of a composite material, the carbon-based material can be easily utilized for general metalworking such as casting.

The elastomer according to one embodiment of the invention may be either a rubber elastomer or a thermoplastic elastomer. In the case of using a rubber elastomer, the elastomer may be in either a crosslinked form or an uncrosslinked form. As the raw material elastomer, an uncrosslinked form is used when using a rubber elastomer.

The step (a) of dispersing the carbon material in the elastomer by applying a shear force may be carried out by using an open-roll method, an internal mixing method, a multi-screw extrusion kneading method, or the like.

According to one embodiment of the invention, there is provided a method of producing a composite material, the method comprising:

(c) mixing the carbon-based material with a matrix material for the composite material.

According to one embodiment of the invention, there is provided a method of producing a composite material, the method comprising:

(a) mixing an elastomer, a particulate or fibrous matrix material, and a carbon material, and dispersing the carbon material by applying a shear force to obtain a composite elastomer;

(b) heat-treating the composite elastomer to vaporize the elastomer included in the composite elastomer to obtain a carbon-based material; and (d) powder forming the carbon-based material.

According to this method of producing a composite material, since wettability between the carbon-based material and the matrix material is improved by using the carbon-based material of which the surface is activated as described above, a composite material including the carbon-based material can be obtained. According to this method of producing a composite material, since aggregation of the carbon material is prevented, a composite material in which the carbon material is uniformly dispersed in the matrix material can be obtained.

These embodiments of the invention are described below in detail with reference to the drawings.

(A) Elastomer

The elastomer has a molecular weight of preferably 5,000 to 5,000,000, and still more preferably 20,000 to 3,000,000. If the molecular weight of the elastomer is within this range, since the elastomer molecules are entangled and linked, the elastomer easily enters the space in the aggregated carbon material (e.g. carbon nanofibers) to exhibit an improved effect of separating the carbon nanofibers. If the molecular weight of the elastomer is less than 5,000, since the elastomer molecules cannot be sufficiently entangled, the effect of dispersing the carbon material is reduced even if a shear force is applied in the subsequent step. If the molecular weight of the elastomer is greater than 5,000,000, since the elastomer becomes too hard, processing becomes difficult.

The network component of the elastomer in an uncrosslinked form has a spin-spin relaxation time ($T2n/30°$ C.), measured at 30° C. by a Hahn-echo method using a pulsed nuclear magnetic resonance (NMR) technique, of preferably 100 to 3,000 μsec, and still more preferably 200 to 1,000 μsec. If the elastomer has a spin-spin relaxation time ($T2n/30°$ C.) within the above range, the elastomer is flexible and has a sufficiently high molecular mobility. Therefore, when the elastomer and the carbon material are mixed, the elastomer can easily enter the space in the carbon material due to high molecular mobility. If the spin-spin relaxation time ($T2n/30°$ C.) is shorter than 100 μsec, the elastomer cannot have a sufficient molecular mobility. If the spin-spin relaxation time ($T2n/30°$ C.) is longer than 3,000 μsec, since the elastomer tends to flow as a liquid, it becomes difficult to disperse the carbon material.

The network component of the elastomer in a crosslinked form preferably has a spin-spin relaxation time ($T2n$), measured at 30° C. by the Hahn-echo method using the pulsed NMR technique, of 100 to 2,000 μsec. The reasons therefor are the same as those described for the uncrosslinked form. Specifically, when crosslinking an uncrosslinked form which satisfies the above conditions using the production method of the invention, the spin-spin relaxation time ($T2n$) of the resulting crosslinked form almost falls within the above range.

The spin-spin relaxation time obtained by the Hahn-echo method using the pulsed NMR technique is a measure which indicates the molecular mobility of a substance. In more detail, when measuring the spin-spin relaxation time of the elastomer by the Hahn-echo method using the pulsed NMR technique, a first component having a shorter first spin-spin relaxation time ($T2n$) and a second component having a longer second spin-spin relaxation time ($T2nn$) are detected. The first component corresponds to the network component (backbone molecule) of the polymer, and the second component corresponds to the non-network component (branched component such as terminal chain) of the polymer. The shorter the first spin-spin relaxation time, the lower the molecular mobility and the harder the elastomer. The longer the first spin-spin relaxation time, the higher the molecular mobility and the softer the elastomer.

As the measurement method in the pulsed NMR technique, a solid-echo method, a Carr-Purcell-Meiboom-Gill (CPMG) method, or a 90-degree pulse method may be applied instead of the Hahn-echo method. However, since the elastomer according to the invention has a medium spin-spin relaxation time ($T2$), the Hahn-echo method is most suitable. In general, the solid-echo method and the 90-degree pulse method are suitable for measuring a short spin-spin relaxation time ($T2$), the Hahn-echo method is suitable for measuring a medium spin-spin relaxation time ($T2$), and the CPMG method is suitable for measuring a long spin-spin relaxation time ($T2$).

At least one of the main chain, side chain, and terminal chain of the elastomer includes an unsaturated bond or a group having affinity to the carbon material, particularly to a terminal radical of the carbon nanofiber, or the elastomer has properties of readily producing such a radical or group. The unsaturated bond or group may be at least one unsaturated bond or group selected from a double bond, a triple bond, and functional groups such as α-hydrogen, a carbonyl group, a carboxyl group, a hydroxyl group, an amino group, a nitrile group, a ketone group, an amide group, an epoxy group, an ester group, a vinyl group, a halogen group, a urethane group, a biuret group, an allophanate group, and a urea group.

The carbon nanofiber generally has a structure in which the side surface is formed of a six-membered ring of carbon atoms and the end is closed by introduction of a five-membered ring. However, since the carbon nanofiber has a forced structure, a defect tends to occur, so that a radical or a functional group tends to be formed at the defect. In one embodiment of the invention, since at least one of the main chain, side chain, and terminal chain of the elastomer includes an unsaturated bond or a group having high affinity (reactivity or polarity) to the radical of the carbon nanofiber, the elastomer and the carbon nanofiber can be bonded. This enables the carbon nanofibers to be easily dispersed by overcoming the aggregating force of the carbon nanofibers. When mixing the elastomer and the carbon material such as the carbon nanofibers, free radicals produced by breakage of the elastomer molecules attack the defects of the carbon nanofibers to produce free radicals on the surfaces of the carbon nanofibers.

As the elastomer, an elastomer such as natural rubber (NR), epoxidized natural rubber (ENR), styrene-butadiene rubber (SBR), nitrile rubber (NBR), chloroprene rubber (CR), ethylene propylene rubber (EPR or EPDM) butyl rubber (IIR), chlorobutyl rubber (CIIR), acrylic rubber (ACM), silicone rubber (Q), fluorine rubber (FKM), butadiene rubber (BR), epoxidized butadiene rubber (EBR), epichlorohydrin rubber (CO or CEO), urethane rubber (U), or polysulfide rubber (T); a thermoplastic elastomer such as an olefin-based elastomer (TPO), poly(vinyl chloride)-based elastomer (TPVC), polyester-based elastomer (TPEE), polyurethane-based elastomer (TPU), polyamide-based elastomer (TPEA), or styrene-based elastomer (SBS); or a mixture of these elastomers may be used. In particular, a highly polar elastomer which readily produces free radicals during mixing of the elastomer, such as natural rubber (NR) or nitrile rubber (NBR), is preferable. An elastomer having a low polarity, such as ethylene propylene rubber (EPDM), may also be used in the invention, since such an elastomer also produces free radicals by setting the mixing temperature at a relatively high temperature (e.g. 50 to 150° C. for EPDM).

The elastomer in one embodiment of the invention may be either a rubber elastomer or a thermoplastic elastomer. When using a rubber elastomer, an uncrosslinked elastomer is preferably used.

(B) Carbon Material

As the carbon material used in one embodiment of the invention, a carbon allotrope may be used. For example, the carbon material may be selected from a carbon fiber, carbon black, amorphous carbon, graphite, diamond, fullerene, and the like. The carbon fiber used herein includes a carbon nanofiber. When using carbon black, since the carbon black is inexpensive and many grades are commercially available, the carbon black can be relatively easily utilized. A nanomaterial such as a minute carbon material (e.g. carbon nanofiber or fullerene) achieves a high reinforcement effect with a small amount of addition.

The amount of the carbon material added may be determined depending on the type of the carbon material and the application.

As the carbon black used in the invention, carbon black of various grades produced by using various raw materials may be used. The carbon black may be in a state of either elementary particles (primary particles) or an aggregate in which the elementary particles are fused and connected (agglomerate). However, carbon black having a comparatively high structure in which the aggregate is grown is preferable when used as the reinforcement filler.

The carbon black used in one embodiment of the invention has an average particle diameter of elementary particles of preferably 100 nm or less, and still more preferably 50 nm or less. The volume effect and the reinforcing effect are increased as the size of the carbon black particle is smaller. In practical application, the average particle diameter is preferably 10 to 30 nm.

The size of the carbon black particle is also indicated by the nitrogen adsorption specific surface area. In this case, the nitrogen adsorption specific surface area is 10 m$^2$/g or more, and preferably 40 m$^2$/g or more as the nitrogen adsorption specific surface area (m$^2$/g) according to JIS K 6217-2 (2001) "Carbon black for rubber industry—Fundamental characteristics—Part 2: Determination of specific surface area—Nitrogen adsorption methods—Single-point procedures".

The reinforcing effect of the carbon black used in one embodiment of the invention is affected by the degree of the structure of the aggregate in which the elementary particles are fused and grown. The reinforcing effect is increased if the DBP absorption is 50 cm$^3$/100 g or more, and preferably 100 cm$^3$/100 g or more. This is because the aggregate forms a higher structure as the DBP absorption is greater.

As the carbon black used in one embodiment of the invention, carbon black of grades such as SAF-HS (N134, N121), SAF (N110, N115), ISAF-HS (N234), ISAF (N220, N220M), ISAF-LS (N219, N231), ISAF-HS (N285, N229), HAF-HS (N339, N347), HAF (N330), HAF-LS (N326), T-HS (N351, N299), T-NS (N330T), MAF (N550M), FEF (NS50), GPF (N660, N630, N650, N683), SRF-HS-HIM (N762, N774), SRF-LM (N760M, N754, N772, N762), FT, HCC, HCF, MCC, MCF, LEF, MFF, RCF, or RCC, or conductive carbon black such as Tokablack, HS-500, acetylene black, or Ketjenblack may be used.

When the carbon material is carbon fiber, particularly carbon nanofiber, the composite elastomer according to one embodiment of the invention preferably includes the carbon nanofibers in an amount of 0.01 to 50 wt %.

The carbon nanofibers preferably have an average diameter of 0.5 to 500 nm. In order to increase the strength of the composite material, the average diameter of the carbon nanofibers is still more preferably 0.5 to 30 nm. The carbon nanofiber may be either a linear fiber or a curved fiber.

As examples of carbon nanofiber, a carbon nanotube and the like can be given. The carbon nanotube has a single-layer structure in which a graphene sheet of a hexagonal carbon layer is closed in the shape of a cylinder, or a multi-layer structure in which the cylindrical structures are nested. Specifically, the carbon nanotube may be formed only of the single-layer structure or the multi-layer structure, or the single-layer structure and the multi-layer structure may be present in combination. A carbon material having a partial carbon nanotube structure may also be used. The carbon nanotube may be called a graphite fibril nanotube.

A single-layer carbon nanotube or a multi-layer carbon nanotube is produced to a desired size by using an arc discharge method, a laser ablation method, a vapor-phase growth method, or the like.

In the arc discharge method, an arc is discharged between electrode materials made of carbon rods in an argon or hydrogen atmosphere at a pressure slightly lower than atmospheric pressure to obtain a multi-layer carbon nanotube deposited on the cathode. When a catalyst such as nickel/cobalt is mixed into the carbon rod and an arc is discharged, a single-layer carbon nanotube is obtained from soot adhering to the inner side surface of a processing vessel.

In the laser ablation method, a target carbon surface into which a catalyst such as nickel/cobalt is mixed is irradiated with strong pulse laser light from a YAG laser in a noble gas (e.g. argon) to melt and vaporize the carbon surface to obtain a single-layer carbon nanotube.

In the vapor-phase growth method, a carbon nanotube is synthesized by thermally decomposing hydrocarbons such as benzene or toluene in a vapor phase. As specific examples of the vapor-phase growth method, a floating catalyst method, a zeolite-supported catalyst method, and the like can be given.

The carbon material may be provided with improved adhesion to and wettability with the elastomer by subjecting the carbon material to a surface treatment, such as an ion-injection treatment, sputter-etching treatment, or plasma treatment, before mixing the carbon material with the elastomer.

(C) Step (a) of Mixing Elastomer and First Carbon Material and Dispersing Carbon Material by Applying Shear Force The step (a) of dispersing the carbon material in the elastomer by applying a shear force may be carried out by using an open-roll method, an internal mixing method, a multi-screw extrusion kneading method, or the like.

In one embodiment of the invention, an example of using an open-roll method with a roll distance of 0.5 mm or less is described below as the step of mixing the carbon nanofibers into the elastomer.

FIG. 1 is a diagram schematically showing the open-roll method using two rolls. In FIG. 1, a reference numeral 10 indicates a first roll, and a reference numeral 20 indicates a second roll. The first roll 10 and the second roll 20 are disposed at a predetermined distance d of preferably 1.0 mm or less, and still more preferably 0.1 to 0.5 mm. The first and second rolls are rotated normally or reversely. In the example shown in FIG. 1, the first roll 10 and the second roll 20 are rotated in the directions indicated by the arrows. When the surface velocity of the first roll 10 is indicated by V1 and the surface velocity of the second roll 20 is indicated by V2, the surface velocity ratio (V1/V2) of the first roll 10 to the second roll 20 is preferably 1.05 to 3.00, and still more preferably 1.05 to 1.2. A desired shear force can be obtained by using such a surface velocity ratio. When causing an elastomer 30 to be wound around the second roll 20 while rotating the first and second rolls 10 and 20, a bank 32 of the elastomer is formed between the rolls 10 and 20. After the addition of carbon nanofibers 40 to the bank 32, the first and second rolls 10 and 20 are rotated. After reducing the distance between the first and second rolls 10 and 20 to the distance d, the first and second rolls 10 and 20 are rotated at a predetermined surface velocity ratio. This causes a high shear force to be applied to the elastomer 30, whereby the aggregated carbon material such as carbon nanofibers is separated by the shear force so that the carbon nanofibers are removed one by one and dispersed in the elastomer 30.

In the step (a), free radicals are produced in the elastomer shorn by the shear force and attack the surface of the carbon material, whereby the surface of the carbon material is activated. When using natural rubber (NR) as the elastomer, each natural rubber (NR) molecule is cut while being mixed by the rolls to have a molecular weight lower the molecular weight prior to being supplied to the open rolls. Since radicals are produced in the cut natural rubber (NR) molecules and attack the surface of the carbon material during mixing, the surface of the carbon material is activated.

In the step (a), the elastomer and the carbon material are mixed at a comparatively low temperature of preferably 0 to 50° C., and still more preferably 5 to 30° C. in order to obtain as high a shear force as possible. In the case of using the open-roll method, it is preferable to set the roll temperature at the above-mentioned temperature.

Since the elastomer according to one embodiment of the invention has the above-described characteristics, specifically, the above-described molecular configuration (molecular length), molecular motion, and chemical interaction with the carbon nanofibers, dispersion of the carbon nanofibers is facilitated. Therefore, a composite elastomer exhibiting excellent dispersibility and dispersion stability (dispersed carbon material rarely reaggregates) of the carbon material can be obtained. In more detail, when mixing the elastomer and the carbon material, the elastomer having an appropriately long molecular length and a high molecular mobility enters the space in the carbon material, and a specific portion of the elastomer bonds to a highly active site of the carbon material such as the carbon nanofiber through chemical interaction. When a high shear force is applied to the mixture of the elastomer and the carbon material in this state, the carbon material moves accompanying the movement of the elastomer, whereby the aggregated carbon material is separated and dispersed in the elastomer. The dispersed carbon material such as the carbon nanofibers is prevented from reaggregating due to chemical interaction with the elastomer, whereby excellent dispersion stability can be obtained.

In the step of dispersing the carbon material in the elastomer by applying a shear force, the above-mentioned internal mixing method or multi-screw extrusion kneading method may be used instead of the open-roll method. In other words, it suffices that this step apply a shear force to the elastomer sufficient to separate the aggregated carbon material and produce radicals by cutting the elastomer molecules.

In the step (a) of mixing the elastomer and the carbon material, or in the preceding step, an element X or a compound of the element X may be mixed into the elastomer. A carbon-based material, in which the element X bonds to the carbon atom of the carbon material, can be obtained by the heat treatment of the step (b) by mixing the element X or a compound of the element X into the elastomer.

In the mixing and dispersing step of the elastomer and the carbon material, or in the subsequent step, a compounding ingredient usually used in processing of an elastomer such as rubber may be added. As the compounding ingredient, a known compounding ingredient may be used. As examples of the compounding ingredient, a crosslinking agent, vulcanizing agent, vulcanization accelerator, vulcanization retarder, softener, plasticizer, curing agent, reinforcing agent, filler, aging preventive, colorant, and the like can be given.

(D) Composite Elastomer Obtained by Above-Described Method

In the composite elastomer according to one embodiment of the invention, the carbon material is uniformly dispersed in the elastomer as a matrix. In other words, the elastomer is restrained by the carbon material. The mobility of the elastomer molecules restrained by the carbon material is small in comparison with the case where the elastomer molecules are not restrained by the carbon material. Therefore, the first spin-spin relaxation time (T2n), the second spin-spin relaxation time (T2nn), and the spin-lattice relaxation time (T1) of the carbon fiber composite material according to one embodiment of the invention are shorter than those of the elastomer which does not include the carbon material.

The number of non-network components (non-reticulate chain components) is considered to be reduced for the following reasons, in a state in which the elastomer molecules are restrained by the carbon material. Specifically, when the molecular mobility of the elastomer is entirely decreased by the carbon material, since the number of non-network components which cannot easily move is increased, the non-network components tend to behave in the same manner as the network components. Moreover, since the non-network components (terminal chains) easily move, the non-network components tend to be adsorbed on the active site of the carbon material. It is considered that these phenomena decrease the number of non-network components. Therefore, the fraction (fnn) of components having the second spin-spin relaxation time becomes smaller than that of an elastomer which does not include the carbon material.

Therefore, the composite elastomer according to one embodiment of the invention preferably has values within the following range, measured by the Hahn-echo method using the pulsed NMR technique.

Specifically, it is preferable that, in the uncrosslinked form, the first spin-spin relaxation time (T2n) measured at 150° C. be 100 to 3,000 µsec, the second spin-spin relaxation time (T2nn) measured at 150° C. be absent or 1,000 to 10,000 µsec, and the fraction (fnn) of components having the second spin-spin relaxation time be less than 0.2.

The spin-lattice relaxation time (T1) measured by the Hahn-echo method using the pulsed NMR technique is a measure which indicates the molecular mobility of a substance in the same manner as the spin-spin relaxation time (T2). In more detail, the shorter the spin-lattice relaxation time of the elastomer, the lower the molecular mobility and the harder the elastomer. The longer the spin-lattice relaxation time of the elastomer, the higher the molecular mobility and the softer the elastomer.

The composite elastomer according to one embodiment of the invention preferably has a flow temperature, determined by temperature dependence measurement of dynamic viscoelasticity, 20° C. or more higher than the flow temperature of the raw material elastomer. In the composite elastomer according to one embodiment of the invention, the carbon material is uniformly dispersed in the elastomer. In other words, the elastomer is restrained by the carbon material as described above. In this state, the elastomer exhibits molecular motion smaller than that of an elastomer which does not include the carbon material, whereby flowability is decreased. The composite elastomer according to one embodiment of the invention having such flow temperature characteristics shows a small temperature dependence of dynamic viscoelasticity to exhibit excellent thermal resistance.

The carbon material, particularly the carbon nanofiber, is generally entangled and dispersed in a medium to only a small extent. However, when using the carbon material, obtained by vaporizing the elastomer in the composite elastomer according to one embodiment of the invention, as a raw material for a metal composite material or the like, the carbon material having an activated surface reacts with the element X such as oxygen and exhibits improved wettability with a matrix material such as a metal. Therefore, a desired performance such as strength as the composite material can be obtained, and the carbon material can be easily dispersed in the matrix material.

(E) Step (b) of Heat-Treating Composite Elastomer to Produce Carbon-Based Material A carbon-based material having an activated surface can be produced by the step (b) of heat-treating the composite elastomer to vaporize the elastomer included in the composite elastomer.

The heat treatment conditions may be arbitrarily selected depending on the type of the elastomer used. The heat treatment temperature is set at a temperature equal to or higher than the vaporization temperature of the elastomer and less than the vaporization temperature of the carbon material.

The step (b) may be performed in the presence of the element X or a compound of the element X so that a carbon-based material in which the element X bonds to the carbon atom of the carbon material is obtained. For example, the composite elastomer may include the element X or a compound of the element X, and the element X may be caused to bond to the carbon atom of the carbon material by the heat treatment of the step (b). Or, the step (b) may be performed in an atmosphere containing the element X or a compound of the element X so that the element X is caused to bond to the carbon atom of the carbon material.

The element X is preferably a light element with a valence of two or more, and may include at least one element selected from beryllium, boron, nitrogen, oxygen, magnesium, silicon, phosphorus, and sulfur. The element X is preferably oxygen. Since oxygen is present in air, oxygen can be easily used in the heat treatment of the step (b). Moreover, oxygen easily reacts with the activated carbon material such as the radical of the carbon nanofiber. Therefore, it is preferable to use oxygen as the element X. Oxygen easily bonds to other materials such as a metal material (e.g. aluminum), and a carbon-based material to which oxygen bonds has the function of a reinforcing material for a composite material containing a metal material as a matrix. In the case of producing a composite material by a step (c) described later, the element X can prevent a direct reaction between the activated carbon material and the matrix metal of the composite material. For example, when the matrix metal of the composite material is aluminum, if the first carbon material directly bonds to aluminum, a substance which easily reacts with water, such as $Al_4C_3$, is produced. Therefore, it is preferable to perform the step (b) of causing the element X to bond to the surface of the first carbon material before the step (c) of vaporizing a metal material Y.

When using oxygen as the element X, oxygen may be allowed to exist in the atmosphere used for the heat treatment of the step (b). When using nitrogen as the element X, the step (b) may be carried out in an ammonium gas atmosphere. When using beryllium, boron, magnesium silicon, phosphorus, sulfur, or the like as the element X, the element or a compound of the element may be mixed into the elastomer before the step (b). In this case, the element X or a compound of the element X may be mixed during mixing in the step (a), for example.

In the step (b) according to one embodiment of the invention, the composite elastomer obtained by the step (a) is disposed in a heat treatment furnace, and the atmosphere inside the furnace is heated to the vaporization temperature of the elastomer such as 500° C. The elastomer is vaporized by this heating, and the surface of the carbon material activated in the step (a) bonds to the element X included in the atmosphere inside the furnace or in the elastomer, whereby a surface-treated carbon-based material is obtained. Since the surface of the carbon material has been activated by tree radicals of the elastomer molecules shorn by the step (a), the surface of the carbon material can easily bond to oxygen present in the atmosphere inside the furnace, for example. Since the surface of the carbon-based material thus obtained is oxidized and activated, the carbon-based material exhibits improved wettability with a matrix material (e.g. metal material).

The surface of the carbon-based material (e.g. carbon nanofiber) thus obtained has a structure in which the carbon atom of the carbon nanofiber bonds to the element X. Therefore, the surface of the carbon-based material (e.g. carbon nanofiber) has a structure in which the surface is covered with the element X (e.g. oxide) layer. The surface structure of the carbon-based material may be analyzed by X-ray photoelectron spectroscopy (XPS) or energy dispersive spectrum (EDS) analysis.

(G) Step (c) of Obtaining Composite Material Using Carbon-Based Material

In the step (c) according to one embodiment of the invention, a composite material, in which a carbon-based material is dispersed in a matrix material such as a metal, can be obtained by using the carbon-based material obtained in the above-described embodiment.

As the step (c) of mixing the carbon-based material with the matrix material of the composite material, (c-1) mixing the carbon-based material with the matrix material and powder forming the resulting mixture, (c-2) mixing the carbon-based material into a molten metal and casting the resulting mixture in a die having a desired shape, (c-3) causing the molten metal to permeate the carbon-based material, or the like may be employed.

c-1: Powder Forming Method

The powder forming step of the composite material in one embodiment of the invention may be performed by mixing the carbon-based material obtained by the above-described step (b) with the matrix material and powder forming the resulting mixture. In more detail, a composite material may be obtained by mixing the carbon-based material obtained in the above-described embodiment with the matrix material (e.g. metal particles) of the composite material, compressing the resulting mixture in a die, and sintering the compressed product at the sintering temperature of the metal particles (e.g. 550° C. when the metal particles are aluminum particles), for example.

The powder forming in one embodiment of the invention is the same as powder forming in a metal forming process, and includes powder metallurgy. As the sintering method, a general sintering method, a spark plasma sintering (SPS) method using a plasma sintering device, or the like may be employed.

The carbon-based material and particles of the matrix material may be mixed by dry blending, wet blending, or the like. In the case of using wet blending, it is preferable to mix (wet-blend) the carbon-based material with particles of the matrix material (e.g. titanium) in a solvent. Since the surface of the carbon-based material has been activated when dry blending or wet blending the carbon-based material, the carbon-based material has excellent wettability with the matrix material and is easily dispersed when utilized for metalworking.

The composite material produced by such powder forming is obtained in a state in which the carbon-based material is dispersed in the metal material as the matrix, for example. A composite material having desired properties can be produced by adjusting the mixing ratio of the matrix material (e.g. metal particles) used in the step (c) to the carbon-based material.

The metal particles used as the matrix material may be appropriately selected from metals used in a general powder forming process, such as iron and an iron alloy, aluminum and an aluminum alloy, magnesium and a magnesium alloy, titanium and a titanium alloy, copper and a copper alloy, zinc and a zinc alloy, either individually or in combination of two or more, depending on the application. As nonmetal particles used as the matrix material, ceramics, glass, or the like may be used either individually or in combination of two or more.

According to one embodiment of the invention, there is provided a method of producing a composite material, the method comprising: (a) mixing an elastomer, a particulate or fibrous matrix material, and a carbon material, and dispersing the carbon material by applying a shear force to obtain a composite elastomer; (b) heat-treating the composite elastomer to vaporize the elastomer included in the composite elastomer to obtain a carbon-based material; and (d) powder forming the carbon-based material. The matrix material is dispersed in the carbon-based material by the step (b) by mixing the matrix material used in the step (c-1) in advance in the step (a). Therefore, a composite material in which the carbon-based material is dispersed can be obtained by performing the step (d) of powder forming the carbon-based material including the matrix material obtained by the step (b).

This enables mixing of the carbon-based material and the matrix material in the step (c) to be omitted. When mixing the matrix material into the elastomer in the step (a), it is preferable that the matrix material be particulate or fibrous. When the matrix material is particulate, the elastomer flows complexly in the step (a), whereby the carbon material can be dispersed more favorably. In the powder forming used herein, a general sintering method, a spark plasma sintering (SPS) method, or the like may be employed in the same manner as in the powder forming described in the step (c-1). The heat treatment temperature in the step (b) is preferably set at a temperature lower than the melting point of the matrix material mixed in the step (a).

c-2: Casting Method

The casting step of the composite material according to one embodiment of the invention may be performed by mixing the carbon-based material obtained in the above-described embodiment into a molten matrix material such as a molten metal, and casting the resulting mixture in a die having a desired shape. In the casting step, a metal mold casting method, a diecasting method, or a low-pressure casting method, in which a molten metal is poured into a die made of steel, may be employed. A method classified into a special casting method, such as a high-pressure casting method in which a molten metal is caused to solidify at a high pressure, a thixocasting method in which a molten metal is stirred, or a centrifugal casting method in which a molten metal is cast into a die by utilizing centrifugal force, may also be employed. In these casting methods, a molten metal is caused to solidify in a die in a state in which the carbon-based material is mixed into the molten metal to form a composite material.

The molten metal used in the casting step may be appropriately selected from metals used in a general casting process, such as iron and an iron alloy, aluminum and an aluminum alloy, magnesium and a magnesium alloy, titanium and a titanium alloy, copper and a copper alloy, zinc and a zinc alloy, either individually or in combination of two or more, depending on the application. As a molten nonmetal, ceramics, glass, or the like may be used either individually or in combination of two or more.

As described above, since the surface of the carbon-based material is activated, wettability of the carbon-based material is improved. Since the carbon-based material has sufficient wettability with the molten matrix material, a homogenous composite material of which the variation in the mechanical properties is decreased over the entire material is obtained.

c-3: Permeation Method

In one embodiment of the invention, a casting step using a pressureless permeation method which causes a molten metal to permeate a metal material is described below in detail with reference to FIGS. 2 and 3.

Figure 2:
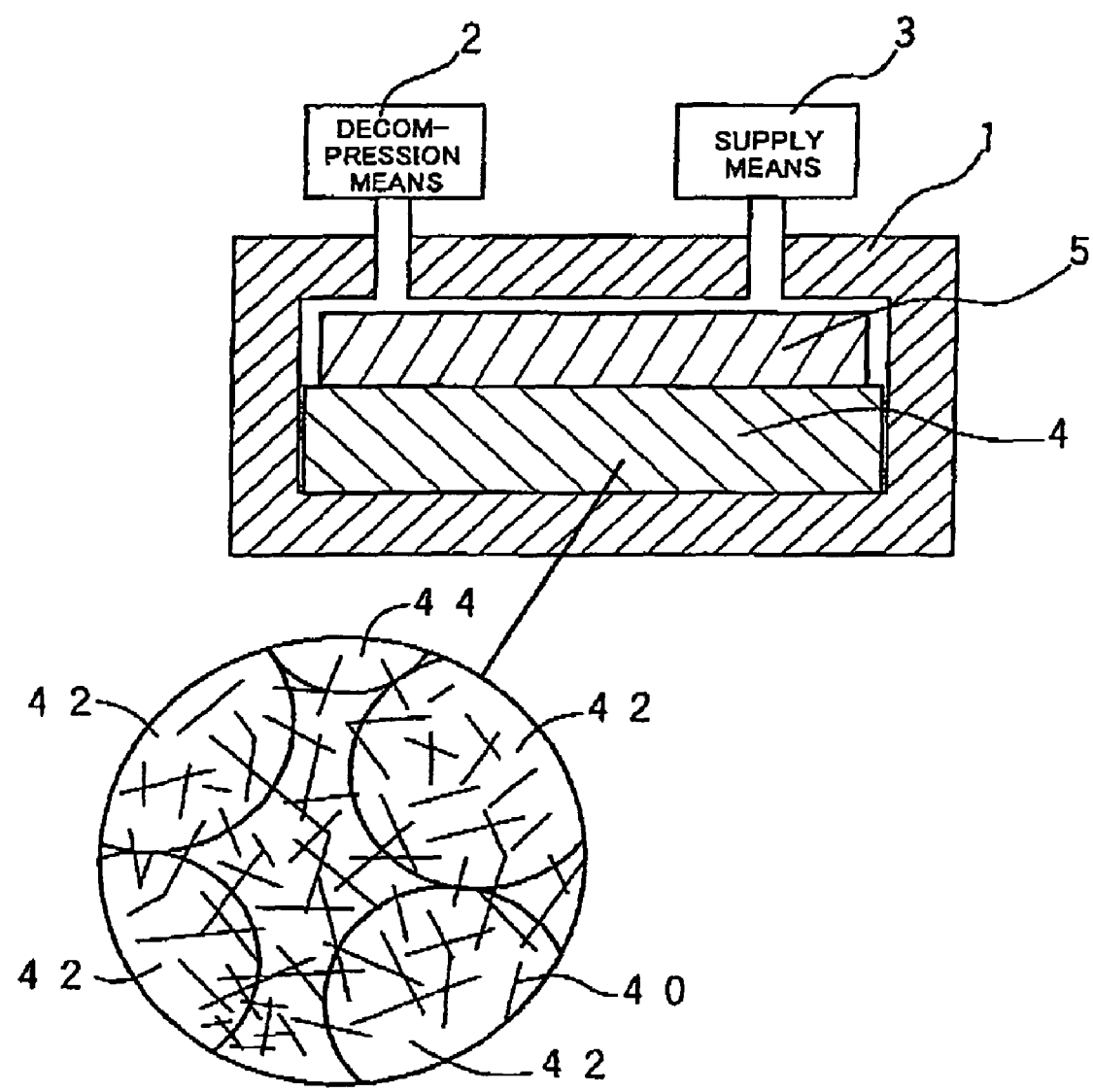
FIG. 2 is a schematic diagram of a device for producing a composite material by using a pressureless permeation method.
Figure 3:
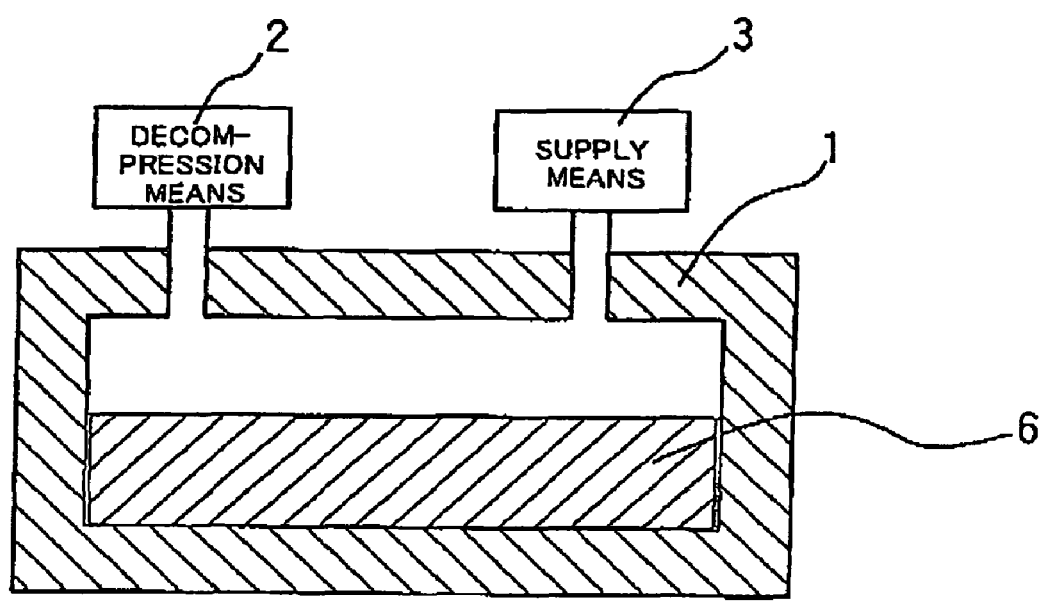
FIG. 3 is a schematic diagram of a device for producing a composite material by using a pressureless permeation method.

FIGS. 2 and 3 are schematic configuration diagrams of a device for producing a composite material by using the pressureless permeation method. The carbon-based material obtained in the above-described embodiment is mixed with particles of a metal material as a matrix of the final product by using a ball mill or the like, and the resulting mixture is compression-preformed in a die to prepare a mixed powder 4. In FIG. 2, the mixed powder 4 (e.g. aluminum particles 42, magnesium particles 44, and carbon nanofibers 40) formed in advance is placed in a sealed container 1. An ingot of the metal material as the matrix such as an aluminum ingot 5 is disposed on the mixed powder 4. The mixed powder 4 and the aluminum ingot 5 disposed in the container 1 are heated to a temperature equal to or higher than the melting point of aluminum by using heating means (not shown) provided in the container 1. The heated aluminum ingot 5 is melted to form molten aluminum (molten metal). The molten aluminum permeates the space in the mixed powder 4.

The mixed powder 4 in one embodiment of the invention is formed to have a space which allows the molten aluminum to rapidly permeate the entire mixed powder 4 by a capillary phenomenon when compression-preforming the mixed powder 4. The atmosphere inside the container 1 may be replaced with a reducing atmosphere by mixing a small amount of magnesium particles 44 into the particulate mixed powder 4 before compression-preforming as described above. The molten aluminum permeates the space between the aluminum particles 42 reduced and provided with improved wettability due to the capillary phenomenon, whereby the mixed powder 4 is entirely filled with the molten aluminum. Heating using the heating means of the container 1 is then terminated so that the molten metal which has permeated the mixed powder 4 is cooled and solidified to obtain a composite material 6, as shown in FIG. 3, in which the carbon nanofibers 40 are uniformly dispersed.

The atmosphere inside the container 1 may be removed by decompression means 2 such as a vacuum pump connected with the container 1 before heating the container 1. Nitrogen gas may be introduced into the container 1 from inert-gas supply means 3 such as a nitrogen gas cylinder connected with the container 1.

The pressureless permeation method is described in the above-described embodiment. However, a pressure permeation method which applies pressure by utilizing the pressure of an atmosphere such as an inert gas may also be used, for example.

As described above, since the surfaces of the carbon nanofibers in the composite material are activated, the carbon nanofibers exhibit improved wettability with the metal material as the matrix. Therefore, a homogenous carbon fiber-metal composite material of which the variation in the mechanical properties is reduced over the entire material is obtained.

Examples according to the invention and comparative examples are described below. However, the invention is not limited to the following examples.

Examples 1 to 3 and Comparative Example 1

(1) Preparation of Sample (a) Preparation of Uncrosslinked Sample (Composite Elastomer)

Step 1: Open rolls with a roll diameter of six inches (roll temperature: 10 to 20° C.) were provided with a predetermined amount (100 g) of a polymer substance (100 parts by weight (phr)) shown in Table 1, and the polymer substance was wound around the roll.

Step 2: A carbon material (carbon nanofiber is indicated as "CNT" in Table 1) was added to the polymer substance in an amount (parts by weight) shown in Table 1. The roll distance was set at 1.5 mm.

Step 4: After the addition of the carbon material, the mixture of the polymer substance and the carbon material was removed from the rolls.

Step 5: After reducing the roll distance from 1.5 mm to 0.3 mm, the mixture was supplied and tight milled. The surface velocity ratio of the two rolls was set at 1.1. The tight milling was repeatedly performed ten times.

Step 6: After setting the rolls at a predetermined distance (1.1 nm), the mixture subjected to tight milling was supplied and sheeted.

Uncrosslinked composite elastomer samples of Examples 1 to 3 were thus obtained. In Examples 1 to 3, carbon nanofibers having a diameter (fiber diameter) of about 10 to 20 nm were used as the carbon material.

(b) Preparation of Carbon-Based Material

The uncrosslinked composite elastomer sample obtained by (a) in each of Examples 1 to 3 was heated at 500° C., which is equal to or higher than the vaporization temperature of the elastomer, for two hours in a furnace in a nitrogen atmosphere containing oxygen so that the elastomer was vaporized and oxidized to obtain a carbon-based material. The oxidation reaction was carried out by utilizing oxygen molecules obtained from a small amount of oxygen and vapor contained in the nitrogen atmosphere and a small amount of oxygen and water contained in the elastomer.

The carbon nanofibers which were not provided with a surface treatment were used as Comparative Example 1.

(c) Preparation of Composite Material 10 g of the carbon-based material obtained by (b) in each of Examples 1 to 3, 500 g of aluminum particles (purity: 99.85%, average particle diameter: 28 μm), and 10 g of magnesium particles (purity: 99.8%, average particle diameter: 45 μm) were mixed by using a ball mill to obtain a mixed powder.

The mixed powder thus obtained was compression formed to dimensions of 30×40×20 mm. After placing an aluminum ingot (metal) on the mixed powder, the mixed powder and the aluminum ingot were disposed in a container (furnace) containing an inert gas (nitrogen) atmosphere and heated to 750° C. The aluminum ingot melted to become molten aluminum. The molten metal permeated the space in the compression formed mixed powder. After completion of permeation of the molten aluminum, the molten aluminum was allowed to cool and solidify to obtain a composite material.

In Comparative Example 1, a composite material was prepared in the same manner as described above using the carbon nanofibers which were not provided with a surface treatment instead of the carbon-based material. In the preparation of the composite material, the magnesium particles were allowed to serve as a reducing agent at the end of the molten aluminum.

The carbon nanofiber content in the composite materials of Examples 1 to 3 was 1.6 vol %.

(2) XPS Analysis Of Carbon-Based Material

Figure 4:
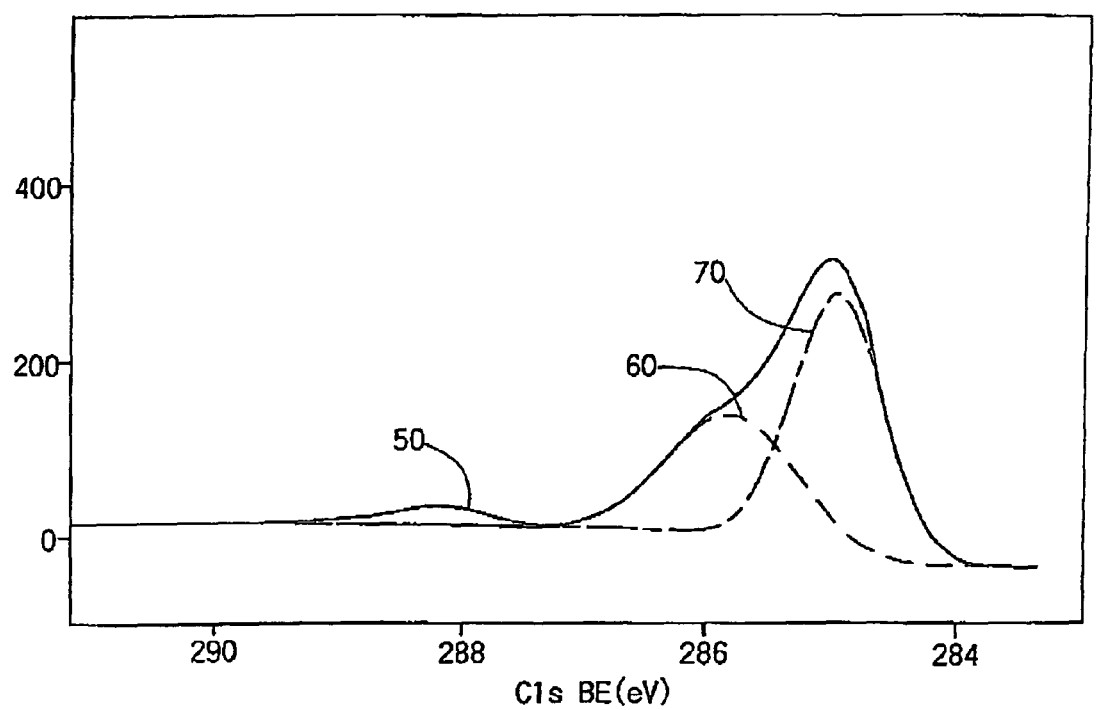
FIG. 4 is a schematic diagram showing XPS data on a carbon-based material obtained in an example according to the invention.

Table 1 shows XPS analysis results of the carbon-based materials obtained by (b) in Examples 1 to 3. In Table 1, a case where the presence of a carbon-oxygen bond was confirmed on the surface of the carbon-based material is indicated as "surface oxidation", and a case where the presence of a carbon-oxygen bond was not confirmed is indicated as "none". FIG. 4 shows a schematic diagram of XPS data on the carbon-based material in Example 1. A first line segment 50 indicates a double bond "C=O", a second line segment 60 indicates a single bond "C—O"$_7$ and a third line segment 70 indicates a carbon-carbon bond.

(3) Measurement of Compressive Yield Strength

A 10×10 mm sample with a thickness of 5 mm was prepared from each of the composite materials obtained by (c) in Examples 1 to 3 and the composite material of Comparative Example 1. The 0.2% yield strength (σ0.2) when compressing the sample at 0.01 mm/min was measured. The maximum value, minimum value, and mean value (MPa) of the compressive yield strength were measured. The results are shown in Table 1.

TABLE 1

|  |  | Example 1 | Example 2 | Example 3 | Comparative Example 1 |
|---|---|---|---|---|---|
| Raw material elastomer | Polymer substance | Natural rubber (NR) | EPDM | Nitrile rubber (NBR) | — |
|  | Polar group | Double bond | Double bond Norbornene | Nitrile group | — |
|  | Average molecular weight | 3,000,000 | 200,000 | 3,000,000 | — |
|  | T2n (30° C.) (μsec) | 700 | 520 | 300 | — |

TABLE 1-continued

|  |  | Example 1 | Example 2 | Example 3 | Comparative Example 1 |
|---|---|---|---|---|---|
|  | T2n (150° C.) (μsec) | 5500 | 2200 | 1780 | — |
|  | T2nn (150° C.) (μsec) | 18000 | 16000 | 13700 | — |
|  | fnn (150° C.) | 0.381 | 0.405 | 0.133 | — |
|  | Flow temperature (° C.) | 40 | 55 | 80 | — |
| Amount | Polymer (phr) | 100 | 100 | 100 | 0 |
|  | CNT (phr) | 10 | 10 | 10 | 100 |
| XPS analysis result | Heat treatment (500° C., 2 hours) | Surface oxidation | Surface oxidation | Surface oxidation | None |
| Tensile strength | Maximum value (MPa) | 445 | 430 | 440 | 75 |
|  | Minimum value (MPa) | 410 | 400 | 405 | 50 |
|  | Mean value (MPa) | 390 | 380 | 385 | 25 |

From the results shown in Table 1, the following items were confirmed by Examples 1 to 3 according to the invention.

From the XPS analysis results of the carbon-based materials of Examples 1 to 3, it was found that the carbon-based material had a structure in which the surface of the carbon-based material was oxidized and oxygen bonded to carbon of the carbon nanofiber.

The compressive yield strength of the composite materials of Examples 1 to 3 was greater than that of Comparative Example 1. While the variation in the compressive yield strength of the composite material of Comparative Example 1 was 50%, the variation in the compressive yield strength of the composite materials of Examples 1 to 3 was 9%. Therefore, it was found that a homogeneous composite material of which the variation in the mechanical properties was reduced over the entire material was obtained.

As described above, according to the invention, it was found that a composite material having uniform mechanical properties, in which carbon nanofibers, which can be generally dispersed in a matrix to only a small extent, are uniformly dispersed, can be obtained. It was also found that a composite material having excellent mechanical properties can be obtained according to the invention due to improvement of wettability between the carbon-based material and aluminum.

Although only some embodiments of the invention have been described in detail above, those skilled in the art will readily appreciate that many modifications are possible in the embodiments without departing from the novel teachings and advantages of this invention. Accordingly, all such modifications are intended to be included within the scope of this invention.

What is claimed is:

1. A method of producing a carbon-based material, the method comprising:
   (a) mixing an elastomer and a carbon material, and dispersing the carbon material by applying a shear force to obtain a composite elastomer; and
   (b) vaporizing the elastomer in the composite elastomer to obtain the carbon-based material having an activated surface by heat-treating the composite elastomer in the presence of oxygen or an oxygen compound,
   wherein oxygen bonds to a carbon atom of the carbon material.

2. The method of producing a carbon-based material as defined in claim 1,
   wherein the step (b) is performed in an atmosphere containing oxygen or the oxygen compound so that oxygen bonds to the carbon atom of the carbon material.

3. The method of producing a carbon-based material as defined in claim 1, wherein the carbon material is a carbon fiber.

4. The method of producing a carbon-based material as defined in claim 3, wherein the carbon fiber is a carbon nanofiber.

5. The method of producing a carbon-based material as defined in claim 4, wherein the carbon nanofibers have an average diameter of 0.5 to 500 nm.

6. The method of producing a carbon-based material as defined in claim 1, wherein the carbon material is a carbon black.

7. The method of producing a carbon-based material as defined in claim 1, wherein the elastomer has a molecular weight of 5,000 to 5,000,000.

8. The method of producing a carbon-based material as defined in claim 1,
   wherein at least one of a main chain, a side chain, and a terminal chain of the elastomer comprises at least one unsaturated bond or group having affinity to carbon nanofibers selected from the group consisting of a double bond, a triple bond, α-hydrogen, a carbonyl group, a carboxyl group, a hydroxyl group, an amino group, a nitrile group, a ketone group, an amide group, an epoxy group, an ester group, a vinyl group, a halogen group, a urethane group, a biuret group, an allophanate group, and a urea group.

9. The method of producing a carbon-based material as defined in claim 1, wherein a network component of the elastomer in an uncrosslinked form has a spin-spin relaxation time (T2n) measured at 30° C. by a Hahn-echo method using a pulsed nuclear magnetic resonance (NMR) technique of 100 to 3,000 μsec.

10. The method of producing a carbon-based material as defined in claim 1, wherein a network component of the elastomer in a crosslinked form has a spin-spin relaxation time (T2n) measured at 30° C. by a Hahn-echo method using a pulsed nuclear magnetic resonance (NMR) technique of 100 to 2,000 μsec.

11. The method of producing a carbon-based material as defined in claim 1, wherein the elastomer is natural rubber or nitrile butadiene rubber.

12. The method of producing a carbon-based material as defined in claim 1, wherein the step (a) is performed by using an open-roll method with a roll distance of 0.5 mm or less.

13. The method of producing a carbon-based material as defined in claim 12, wherein two rolls used in the open-roll method have a surface velocity ratio of 1.05 to 3.00.

14. The method of producing a carbon-based material as defined in claim 1, wherein the step (a) is performed by using an internal mixing method.

15. The method of producing a carbon-based material as defined in claim 1, wherein the step (a) is performed by using a multi-screw extrusion kneading method.

16. The method of producing a carbon-based material as defined in claim 1, wherein the step (a) is performed at 0 to 50° C.

17. A method of producing a composite material, the method comprising:
(c) mixing the carbon-based material obtained by the method as defined in claim 1 with a matrix material.

18. A method of producing a composite material, the method comprising:
(a) mixing an elastomer, a particulate or fibrous matrix material, and a carbon material, and dispersing the carbon material by applying a shear force to obtain a composite elastomer;
(b) vaporizing the elastomer in the composite elastomer to obtain the carbon-based material having an activated surface by heat-treating the composite elastomer in the presence of oxygen or an oxygen compound,
wherein oxygen bonds to a carbon atom of the carbon material; and
(d) powder forming the carbon-based material.

19. The method of producing a composite material as defined in claim 18, wherein the step (d) comprises mixing the carbon-based material with a matrix material of the composite material, the matrix material being in powder form.

20. The method of producing a composite material as defined in claim 18, wherein the composite material has a compressive yield strength of at least 380 MPa.

* * * * *